US009473995B1

United States Patent
Ramamurthy et al.

(10) Patent No.: US 9,473,995 B1
(45) Date of Patent: *Oct. 18, 2016

(54) USE OF PACKET DATA DUPLICATION TO MANAGE ACCESS NETWORK CONNECTIONS

(71) Applicant: Sprint Spectrum L.P., Overland Park, KS (US)

(72) Inventors: Suryanarayanan Ramamurthy, Olathe, KS (US); Saravana Velusamy, Olathe, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,585

(22) Filed: Jan. 8, 2016

Related U.S. Application Data

(63) Continuation of application No. 14/073,363, filed on Nov. 6, 2013, now Pat. No. 9,258,755.

(51) Int. Cl.
*H04W 4/00* (2009.01)
*H04W 36/14* (2009.01)
*H04W 84/04* (2009.01)

(52) U.S. Cl.
CPC ............. *H04W 36/14* (2013.01); *H04W 84/04* (2013.01)

(58) Field of Classification Search
None
See application file for complete search history.

(56) References Cited

U.S. PATENT DOCUMENTS

| 8,238,311 | B2 * | 8/2012 | Shaheen | H04W 36/0016 370/334 |
| 2010/0215021 | A1 * | 8/2010 | Li | H04N 21/2383 370/331 |
| 2013/0080612 | A1 * | 3/2013 | Armstrong | H04L 45/302 709/223 |

OTHER PUBLICATIONS

3GPP, "3rd Generation Partnership Project; Technical Specification Group Services and system Aspects; Architecture enhancements for non-3GPP accesses (Release 10)," 3GPP TS 23.402, V10.4.0, (Jun. 2011).

* cited by examiner

*Primary Examiner* — Kouroush Mohebbi

(57) ABSTRACT

As a communication device receives packet data via a first access network, the communication detects that packet data arriving via a second access network is duplicative of the packet data that the communication device is receiving via the first access network. In response to detecting such duplication, the communication device discontinues being served by the first access network and continues with communication via the second access network.

15 Claims, 6 Drawing Sheets

USE OF PACKET DATA DUPLICATION TO MANAGE ACCESS NETWORK CONNECTIONS

REFERENCE TO RELATED APPLICATION

This is a continuation of U.S. patent application Ser. No. 14/073,363, filed Nov. 6, 2013, the entirety of which is hereby incorporated by reference.

BACKGROUND

Unless otherwise indicated herein, the materials described in this section are not prior art to the claims and are not admitted to be prior art by inclusion in this section.

In general, a given region may include a number of different access networks arranged to provide communication devices with access to engage in packet-data communication on a transport network such as the Internet. These access networks may be arranged to serve communication devices over wired or wireless interfaces and may take any of a variety of forms. In practice, for instance, each such access network may include one or more access nodes with which communication devices can directly communicate and may further include or connect with other supporting infrastructure such as routers, switches, and gateways that provide packet-data network connectivity. When a communication device connects with an access node of such an access network, the access node or the supporting infrastructure may then assign an Internet Protocol (IP) address to the communication device, or the communication device may have a previously assigned IP address. The communication device may then use its IP address to engage in packet-data communication via the access network with various remote entities, such as other communication devices or network servers for instance.

At times, it may be desirable for a communication device to transition from being served by one such access network to being served by another such access network. This may occur, for instance, as the device moves from an area where just one access network provides service to an area where another access network also provides service, and/or in view of various considerations, such as application requirements, cost of service, quality of service, network load, and the like. In practice, when a device engages in such a transition, the device may disconnect from its serving access network and newly connect with the other access network. The device may thus stop being served by one access network and proceed to be served by the other access network.

OVERVIEW

In a scenario where a communication device is currently engaged in packet-data communication via a first access network and transitions to be served by a second access network, the communication device may stop engaging in the packet-data communication via the first network and may seek to continue the packet-data communication instead via the second access network. In some cases, this process may work fine. For instance, if the packet-data communication is non-real-time communication such an e-mail exchange or file transfer, the communication device may be able to simply pick up via the second access network where the device left off via the first access network. In other cases, however, timing or other issues may arise.

Consider a scenario, for example, where a communication device is actively engaged in a packet-based real-time media session, such as a voice over IP (VoIP) session, served by a call server in an Internet Multimedia Subsystem (IMS), and where the connectivity provided by the first access network allows for communication with the IMS but the connectivity provided by the second access network does not allow for communication with the IMS. To enable the communication device to continue the media session via the second access network, the communication device may establish a secure tunnel with a gateway of the second access network, and the gateway of the second access network can then interface with a gateway of the first access network that provides access to the IMS. The communication device can then continue the media session by communicating through an inter-network path including the second access network and secure tunnel, the interface between the gateways, and the connection between the gateway of the first access network and the IMS.

Unfortunately, however, a problem that can arise in that scenario is that, as soon as the communication device connects with the second access network, the device may immediately discontinue its connection with the first access network and may seek to continue the media session via the second access network, but the inter-network path via the second network out to the IMS might not yet be fully established. Until that inter-network path is fully established, packet-data communication with the IMS may therefore be interrupted.

From the perspective of the communication device, this problem can arise, for instance, if the device is running a communication application, such as a VoIP application, and has a physical layer that connects with access networks, and a network layer establishes the secure tunnel with the gateway of the second access network. In practice, the physical layer may connect with the second access network and responsively discontinue its connection with the first access network. However, when that disconnection from the first access network occurs, the network layer may not yet have established the secure tunnel with the gateway of the second access network, and the gateway of the second access network may not yet be interfacing with the gateway of the first access network. Consequently, packet-data would not flow between the IMS and the communication device, which could pose a user experience issue.

Disclosed herein is a method and system to help overcome this problem and perhaps other such problems. The disclosure may apply in a scenario where a communication device is being served by a first access network and is receiving packet data via the first access network, but where the device is also being served by a second access network. In that scenario, a gateway of the first access network may be transmitting packet data from a remote entity to the communication device via the first access network. Further, once an inter-network path is established, such as between the communication device and a gateway of the second access network, and between the gateway of the second access network and the gateway of the first access network, the gateway of the first access network may then transmit in parallel a duplicate of the packet data from the remote entity via the inter-network path to the communication device. The communication device may thus begin receiving via the second access network a duplicate of the packet data that the communication is receiving via the first access network.

As this packet data flows to the operating system and/or application layer of the communication device, the communication device may simply discard the duplicates of already received packets. In accordance with the disclosure, however, upon detecting receipt of such duplicate packet data (perhaps a sufficient extent, such as a predefined number of duplicate packets and/or a predefined duration of receiving duplicates), the device may take that as a sign that the session is now fully transferred to the second access network. Consequently, in response to detecting receipt of duplicate packet data, the communication device may then discontinue being served by the first access network, such as by ending its connection with the first access network. The communication device may then proceed with the communication via the second access network.

Accordingly, in one respect, disclosed is a method operable by a communication device. The method involves the device being served by a first access network and receiving packet data from a remote endpoint via the first access network. Further, the method involves, while the device is receiving the packet data from the remote endpoint via the first access network, the device being served by a second access network and beginning to receive a duplicate of the packet data from the remote endpoint via the second access network. Still further, the method involves the device detecting that the packet data that the communication device is receiving from the remote endpoint via the second network is duplicative of the packet data that the communication device is receiving from the remote endpoint via the first network. And the method involves, responsive to the detecting, the communication device discontinuing being served by the first network.

In another respect, disclosed is a method operable by a user equipment device (UE), which can generally be any communication device regardless of whether it is in fact operated by a person. In accordance with the disclosure, the method involves the UE receiving packet-based real-time media from a remote endpoint via a first access system that serves the UE over a first air interface, in a scenario where a first bearer tunnel extends from a packet-gateway (PGW) to the UE via the first air interface, and where the packet-based real-time media flows from the remote endpoint to the PGW and via the first bearer tunnel from the PGW to the UE. Further, the method involves, while the UE is receiving the packet-based real-time media via the first access system, the UE being served by a second access system over a second air interface and the UE beginning to receive via the second access system a duplicate of the packet-based real-time media that the UE is receiving via the first access system, in a scenario where a second bearer tunnel extends from the PGW to the UE via the second air interface, and where the duplicate of the packet-based real-time media flows from via the second bearer tunnel from the PGW to the UE. The method then involves the UE detecting that the UE is receiving the duplicate of the packet-based real-time media via the second access system, and the UE responsively discontinuing being served by the first access system.

And in still another respect, disclosed is a UE that includes a first radio configured for the UE to be served by a first access system over a first air interface, and a second radio configured for the UE to be served by a second access system over a second air interface. Such a UE is configured to detect, while the UE is being served by the first access system over the first air interface and is receiving packet-based real-time media from a remote entity via the first access system, that the UE begins to receive a duplicate of the packet-based real-time media from the remote entity via the second access system. Further, the UE is configured to respond to that detecting at least in part by discontinuing being served by the first access system. The UE may then proceed with receipt of the packet-based real-time media from the remote entity via the second system.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

As noted above, FIG. 1 is a simplified block diagram of a network arrangement in which an embodiment of the present method and system can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Figure 1:
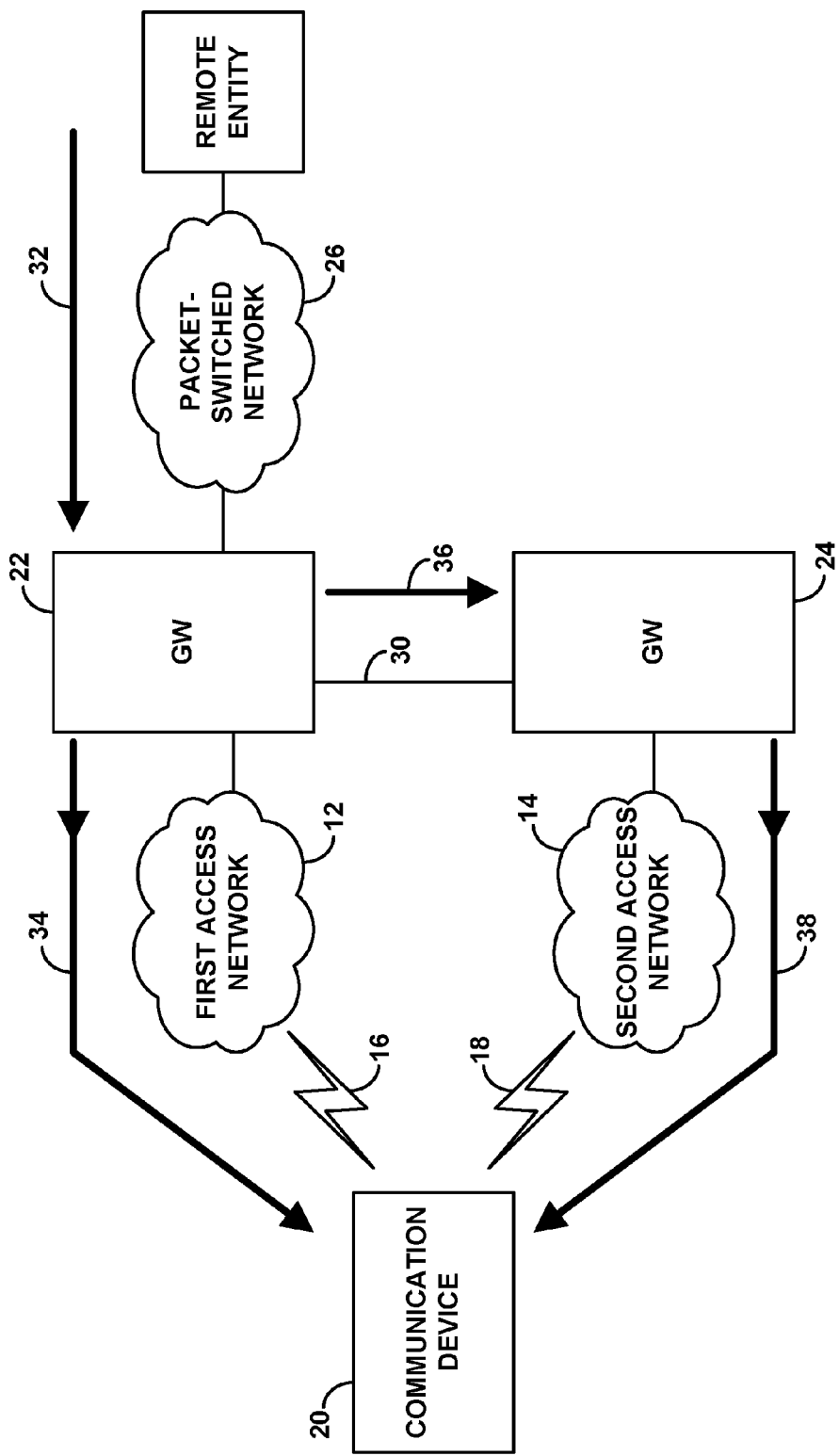
FIG. 1 is a simplified block diagram of a network arrangement in which an embodiment of the present method and system can be implemented.

The arrangement of FIG. 1 includes by way of example two representative access networks, a first access network 12 and a second access network 14, each of which may function to provide communication devices with connectivity to engage in packet-data communication. These access networks may take any of a variety of forms but are shown by way of example providing air interfaces 16, 18 over which to server a representative communication device 20. Each access network is further shown having a respective gateway 22, 24, which may provide connectivity with a packet-switched network such as the Internet or a private packet network for instance, to allow communication with various remote entities. By way of example, gateway 22 of the first access network 12 is shown providing connectivity with a representative packet-switched network 26, which connects in turn with a representative remote entity 28. Further, the arrangement includes an interface 30 between the gateways.

With this example arrangement, the communication device 20 may be initially served by just the first access network 12 and may be in communication via the first access network with the remote entity 28. For instance, the communication device may be registered with the first access network, the first access network may have assigned air interface traffic resources on which the communication device can transmit and receive packet data, and the gateway 22 or another entity of the first access network may have assigned an IP address for use by the communication device to communicate on the packet-switched network 26. The communication device may therefore engage in packet-data communication with the remote entity 28 through a first path that includes one segment 32 extending over the packet-switched network 26 between the remote entity 28 and the gateway 22, and another segment 34 extending via the first access network 12 and the air interface 16 between the gateway 22 and the communication device 20. In particular, the communication device may transmit packet data to the remote entity via this path and, as represented by the arrows in the figure, the communication device may receive packet data from the remote entity via this path.

At some point while being served by the first access network and engaging in packet-data communication with the remote entity via this path, the communication device may then begin being served by second access network 14 as well. In practice, this may happen for various reasons, such as movement of the communication device into an area where the second access network provides service, and/or considering cost, quality of service, and other factors as mentioned above for instance. The communication device may thus become registered with the second access network, and the second access network may assign air interface resources and an IP address for use by the communication device, to enable the communication device to engage in packet-data communication via the second access network.

Once the communication device begins being served by the second access network 14 and communicating with the gateway 24 of the second access network, gateway 24 may signal to gateway 22 of the first access network to establish inter-gateway communication over interface 30 for the communication device. In practice, for instance, gateway 24 may query a server such as an authentication, accounting, and authorization (AAA) server, to determine that the communication device currently has an active session via gateway 22, and gateway 24 may therefore engage in this signaling with gateway 22 to establish the inter-gateway communication.

With the inter-gateway communication established, gateway 22 of the first access network may then begin to clone packet data that is destined to the communication device. Thus, as gateway 22 receives packet data from remote entity over segment 32 and transmits that packet-data over segment 34 to the communication device, gateway 22 may also send in parallel a copy of that packet data over a segment 36 extending through interface 30 between the gateways and a segment 38 extending through the second access network 14 and air interface 18 to the communication device. To facilitate this inter-gateway communication in practice, the gateways may use packet header encapsulation, so that the communication device can communicate with gateway 24 of the second access network using an IP address that the second access network assigned to the communication device, but the gateway 22 of the first access network may continue to exchange the device's packets with the remote entity using the IP address that the first access network assigned to the communication device.

As a result of this parallel transmission of packet data by gateway 22, the communication device will thus begin receiving duplicate packet data. And in accordance with the present disclosure, when the communication device detects that it is receiving via the second access network 14 a duplicate of the packet data that it is receiving via the first access network, i.e., generally that it is receiving a duplicate of the packet data from remote entity 28, the communication device may take that as a sign that communication with the remote entity 28 via the second access network 14 is now successfully established. Consequently, the communication device may then responsively discontinue being served by the first access network 12, such as by deregistering from the first access network and perhaps powering down its first network physical communication interface. The communication device may then proceed to engage in packet data communication with the remote entity 28 via the path extending over segment 32, segment 36, and segment 38.

Figure 2:
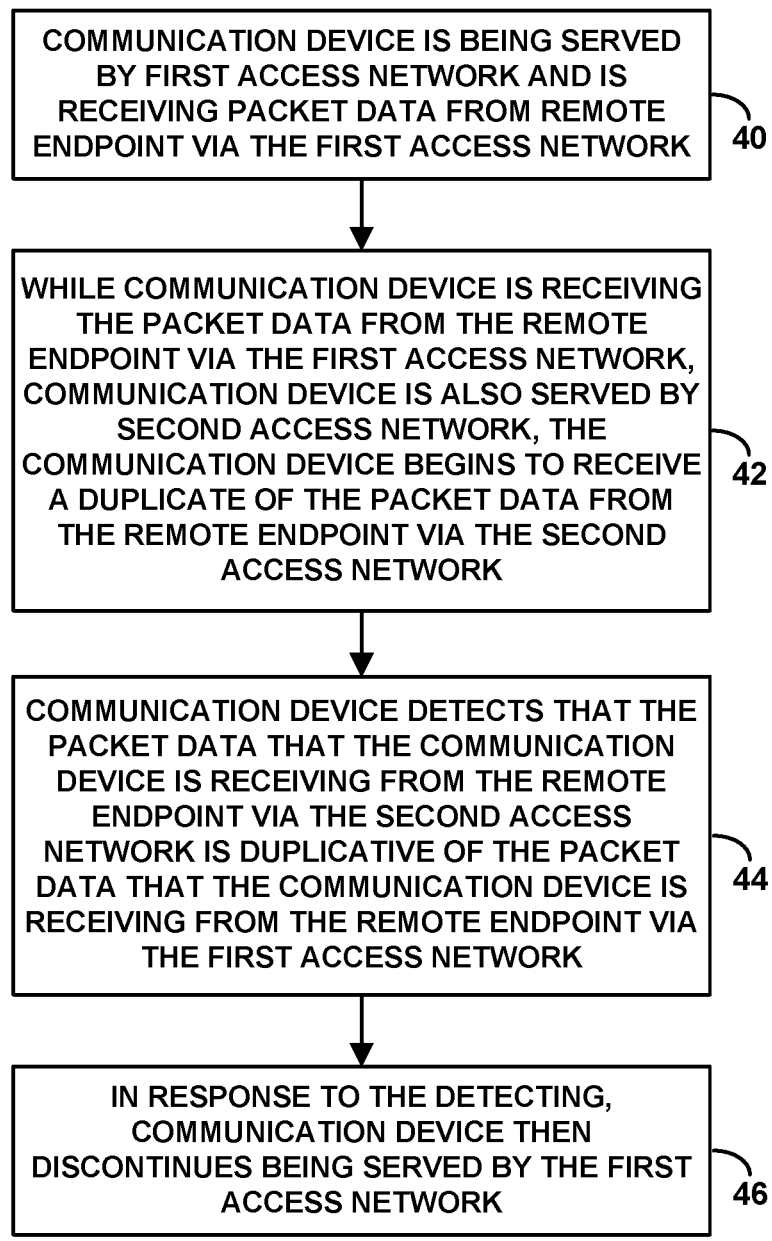
FIG. 2 is a flow chart depicting in functions that can be carried out in accordance with an embodiment of the method.

FIG. 2 is next a flow chart depicting in summary various functions involved in this process. As shown in FIG. 2, at block 40, the method starts as the communication device 20 is being served by the first access network 12 and is receiving packet data from the remote endpoint 28 via the first access network. At block 42, while the communication device is receiving the packet data from the remote endpoint via the first access network, the communication device is then also served by the second access network 14, and the communication device begins to receive a duplicate of the packet data from the remote endpoint via the second access network. At block 44, the communication device thus detects that the packet data that the communication device is receiving from the remote endpoint via the second access network is duplicative of the packet data that the communication device is receiving from the remote endpoint via the first access network. And at block 46, in response to that detecting, the communication device then discontinues being served by the first access network.

In line with the discussion above, the packet data in this process may define a packet-based real-time media stream, such as a VoIP stream. The remote endpoint 28 may then be an entity transmitting that VoIP stream, such as a call server in an IMS, or a remote user device for instance.

Further, in a representative implementation, the communication device could be a wireless communication device, such as a cell phone or wirelessly equipped computer, the first access network could be a first radio access network that serves the communication device over a first air interface according to a first air interface protocol, and the second access network could comprise a second radio access network that serves the communication device over a second air interface according to a second air interface protocol different than the first air interface protocol. For instance, the first air interface protocol could be a Wireless Wide Area Network (WWN) protocol such as Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communications (GSM), or a Wireless Local Area Network (WLAN) protocol such as WIFI (IEEE 802.11), Bluetooth, among others, and the second air interface protocol could be another one of these or other protocols.

In that implementation, the communication device may communicate with the first access network 12 over a bearer assigned for communication by the first access network. For instance, the first access network may establish for the communication device a bearer comprising a radio bearer extending between a wireless access node (e.g., base station or access point) and the communication device and an access bearer extending between the wireless access node and gateway 22. The act of the communication device discontinuing being served by the first access network may then involve the communication device transmitting to the first access network a detach request (e.g., deregistration request) to which the first access network is configured to respond by releasing the bearer assigned for the communication device.

Figure 3:
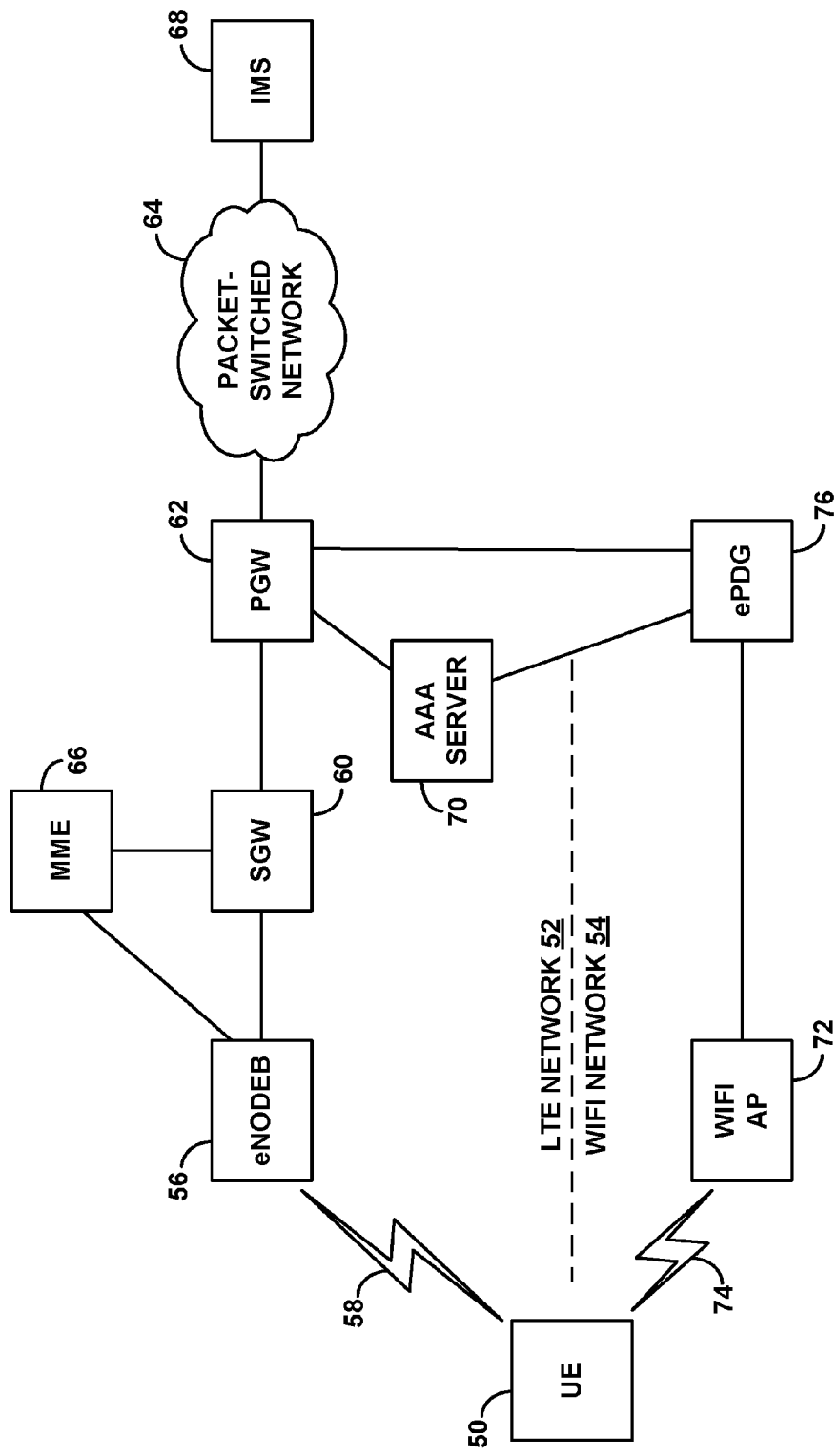
FIG. 3 is another simplified block diagram of a network arrangement in which an embodiment of the present method and system can be implemented.

Turning next to FIG. 3, another block diagram is provided to help explain more specifically how the present method might apply as a communication device moves between being served by an LTE connection and being served by a WIFI connection. Various aspects of this arrangement may apply in other contexts as well, however, such as with use of other types of connections for instance.

In FIG. 3, the communication device is shown as a "user equipment" device (UE) 50 in accordance with LTE terminology, although the UE may or may not actually be user-operated. The UE 50 is then shown within coverage of an LTE access network 52 and further within coverage of a WIFI access network 54.

The LTE access network 52 is shown including an eNodeB (base station) 56 that is configured to serve UEs such as UE 50 over an LTE air interface 58. Further, the eNodeB has an interface with a serving gateway (SGW) 60, which in turn has an interface with a packet data network gateway (PGW) 62 that then provides connectivity with a packet-switched network 64. Further, the LTE access network 52 is shown including a mobility management entity (MME) 66 that has an interface with the eNodeB 56 and with the SGW 60 and that functions to facilitate management of bearers for UEs.

With this arrangement, when UE 50 enters into coverage of eNodeB 56, the UE may transmit to the eNodeB an attach request, which may pass to the MME 66. In response, the MME may then signal with the SGW 60, which may signal in turn with the PGW. The PGW may then assign an IP address for use by the UE to communicate on packet-switched network 64, and the various network entities may work to establish a bearer tunnel for the UE including a radio bearer extending over the air interface 58 between the UE and the eNodeB, and an access bearer extending via the SGW between the eNodeB and the PGW. The UE may then engage in packet data communication on packet-switched network 64 with various remote entities.

Further shown in the arrangement of FIG. 1 is an IMS 68, which may support packet-based real-time media communication such as VoIP communication and may thus include a call server and various other nodes, and an AAA server 70, which may facilitate tracking sessions and data usage for billing and other purposes. Once the UE attaches with the LTE network, the UE may engage in packet-based signaling with the IMS, in accordance with the Session Initiation Protocol (SIP) for instance, to establish a packet-based real-time media session, and the PGW or other entity may signal with the AAA server 70 to allow the AAA server to record the session state and/or data usage by the UE. Through this packet-based real-time media session, the UE may receive from the IMS packet-data representing media such as voice and may play out that media to a user if appropriate. Further, the UE may receive media such as voice from a user and may transmit that media in packet-data to the IMS.

The WIFI access network 54, on the other hand, is shown including a WIFI access point 72 that is configured to serve UEs such as UE 50 over a WIFI air interface 74. Further, the WIFI network may include (e.g., make use of) various other network nodes such as routers, switches, gateways, and the like, to facilitate providing UEs with packet-switched network connectivity. As shown, for instance, the WIFI network includes an evolved packet data gateway (ePDG) 76, with which UEs served by the WIFI network may establish secure communication, and the ePDG then has an interface 78 with the PGW 62 of the LTE network, so as to enable UEs served by the WIFI network to communicate on packet-switched network 64 and in turn with IMS 68 and/or other entities. Further, ePDG 76 is shown have an interface with the AAA server 70 as well, so that ePDG can determine UE session state and otherwise interact with the AAA server.

With this arrangement, when UE 50 enters into coverage of WIFI access point 72, the UE may transmit to the WIFI access point an association request and may ultimately establish connectivity with the WIFI access point. Further, the WIFI access point or another entity of the WIFI network may assign to the UE an IP address for use to communicate in the WIFI network, possibly making use of network address translation or other functionality to facilitate communication on the public Internet or other external packet-switched networks. The UE may then engage in packet-data communication through the WIFI network.

In accordance with the present disclosure, in the arrangement of FIG. 3, UE 50 may currently be engaged in a VoIP session with IMS 68, with packet-based real-time media flowing between the IMS and the UE via the packet-switched network 64, the PGW 62, the SGW 60, the eNodeB 56, and the LTE air interface 58. While engaged in that session, the UE may then detect coverage of the WIFI access point 72 and may associate with the WIFI access point and receive an IP address assignment for use on the WIFI network. Further, the UE may then engage in signaling with the ePDG 76 to establish secure communication, such as an IPsec tunnel, with the ePDG. In this process, or in response to this process, the ePDG may then query the AAA server 70 to thereby determine that the UE is currently engaged in a packet-data session anchored at the PGW 62. Consequently, the ePDG may engage in signaling with the PGW 62 to establish a packet-encapsulation tunnel for the UE over interface 78, so as to provide a path through which the UE can continue that session via the WIFI network.

Once the PGW 62 and ePDG 76 have established their inter-gateway communication for the UE, the PGW 62 may then begin cloning the packet data that the PGW 62 is receiving from IMS 68 and that the PGW is transmitting via the LTE network 52 to the UE, and the PGW may transmit the resulting copy of the packets to ePDG 76 for transmission via the WIFI network 54 to the UE as well. Thus, as the UE is receiving packet data from the IMS via the LTE network, the UE would begin receiving a duplicate of that packet data from the IMS via the WIFI network. And in response to detecting its receipt of such duplicate packet-data, the UE may then discontinue being served by the LTE network and proceed with the session just via the WIFI network.

Figure 4:
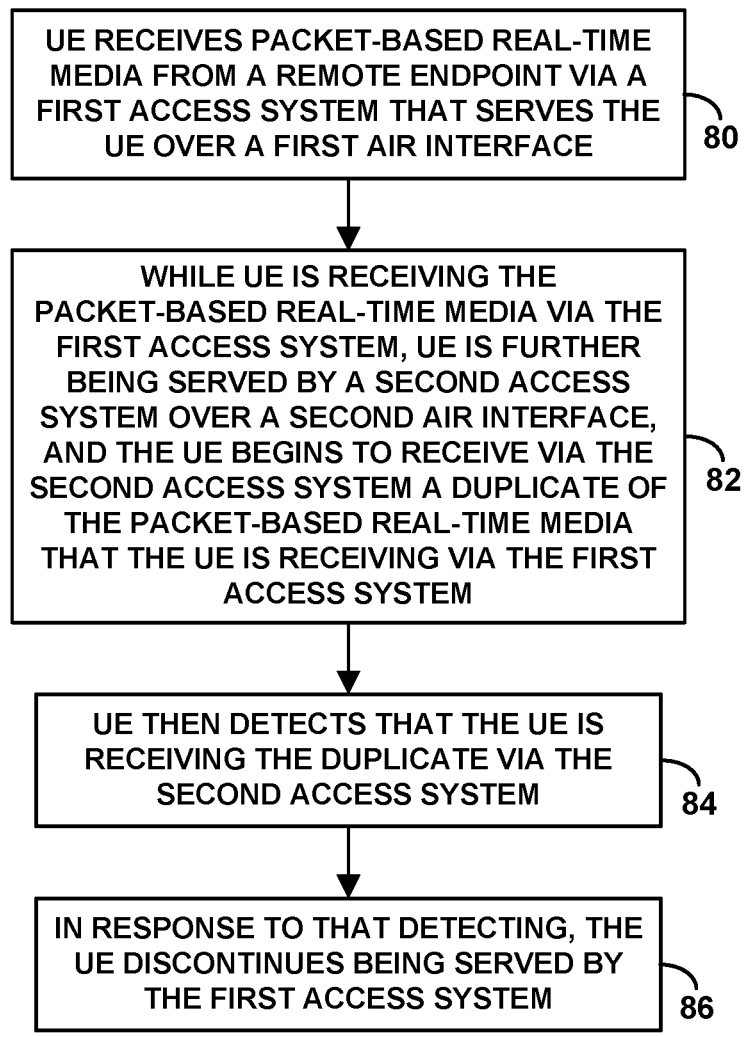
FIG. 4 is another flow chart depicting functions that can be carried out in accordance with an embodiment of the method.

FIG. 4 is a flow chart depicting in summary some of the functions that may be involved in this more specific process. As shown in FIG. 4, at block 80, a UE receives packet-based real-time media from a remote endpoint via a first access system that serves the UE over a first air interface, where a first bearer tunnel extends from PGW to the UE via the first air interface, and where the packet-based real-time media flows from the remote endpoint to the PGW and via the first bearer tunnel from the PGW to the UE. For instance, in the arrangement of FIG. 3, the first access system may be the LTE network 52 (or another such WWAN or other network), and the UE may receive packet-based real-time media from the IMS via the LTE network, via a bearer that extends from the PGW, via the LTE air interface, to the UE.

At block 82, while the UE is receiving the packet-based real-time media via the first access system, the UE is further being served by a second access system over a second air interface, and the UE begins to receive via the second access system a duplicate of the packet-based real-time media that the UE is receiving via the first access system, where a second bearer tunnel extends from the PGW to the UE via the second air interface, and where the duplicate of the packet-based real-time media flows from via the second bearer tunnel from the PGW to the UE. In FIG. 3, for instance, the second access system may be the WIFI network 54 (or another WLAN or other access network), and the UE may already have been served as well by the WIFI network or may begin to be served by the WIFI network, and the UE may begin to receive a duplicate of the packets from the IMS, transmitted over a bearer tunnel from the PGW to the ePDG and from the ePDG, via the WIFI air interface to the UE.

At block 84, the UE then detects that the UE is receiving the duplicate via the second access system. And at block 86, in response to that detecting, the UE discontinues being served by the first access system. For instance, the UE may transmit a detach request to the LTE network to trigger release of the UE's assigned LTE bearer and/or other such resources. The UE may then proceed to engage in the packet-based real-time media session via the WIFI network.

In practice, the UE may have a first radio for being served by the first access system over the first air interface, and a second radio for being served by the second access system over the second air interface. Further, the first access system may comprise a first access node (e.g., LTE eNodeB 56) that serves the UE over the first air interface, and the first bearer tunnel may extend from the PGW to the first access node and from the first access node to first radio of the UE. Likewise, the second access system may comprise a second access node (e.g., WIFI access point 72) that serves the UE over the second air interface, and the second bearer tunnel may extend from the PGW to another gateway (e.g., ePDG 76), from the other gateway to the second access node, and from the second access node to the second radio of the UE.

In such an arrangement, the act of discontinuing being served by the first access system may involve the UE transmitting to the first access system via the first air interface a detach request that triggers release of the first bearer tunnel. In the arrangement of FIG. 3, for instance, this may cause MME 66 to manage tear-down of one or more bearers assigned to the UE, through signaling with the eNodeB and SGW and between the SGW and PGW. Optimally, the PGW would maintain the IP address that it had assigned for the UE, so that that IP address can continue to be used in the session that will proceed via the WIFI network.

Furthermore, the act of discontinuing being served by the first access system may also involve powering down the first radio. For instance, once the UE has detached from the LTE network, the UE may then power down its LTE radio, to help conserve battery power as the UE continues with the session via the WIFI network.

Figure 5:
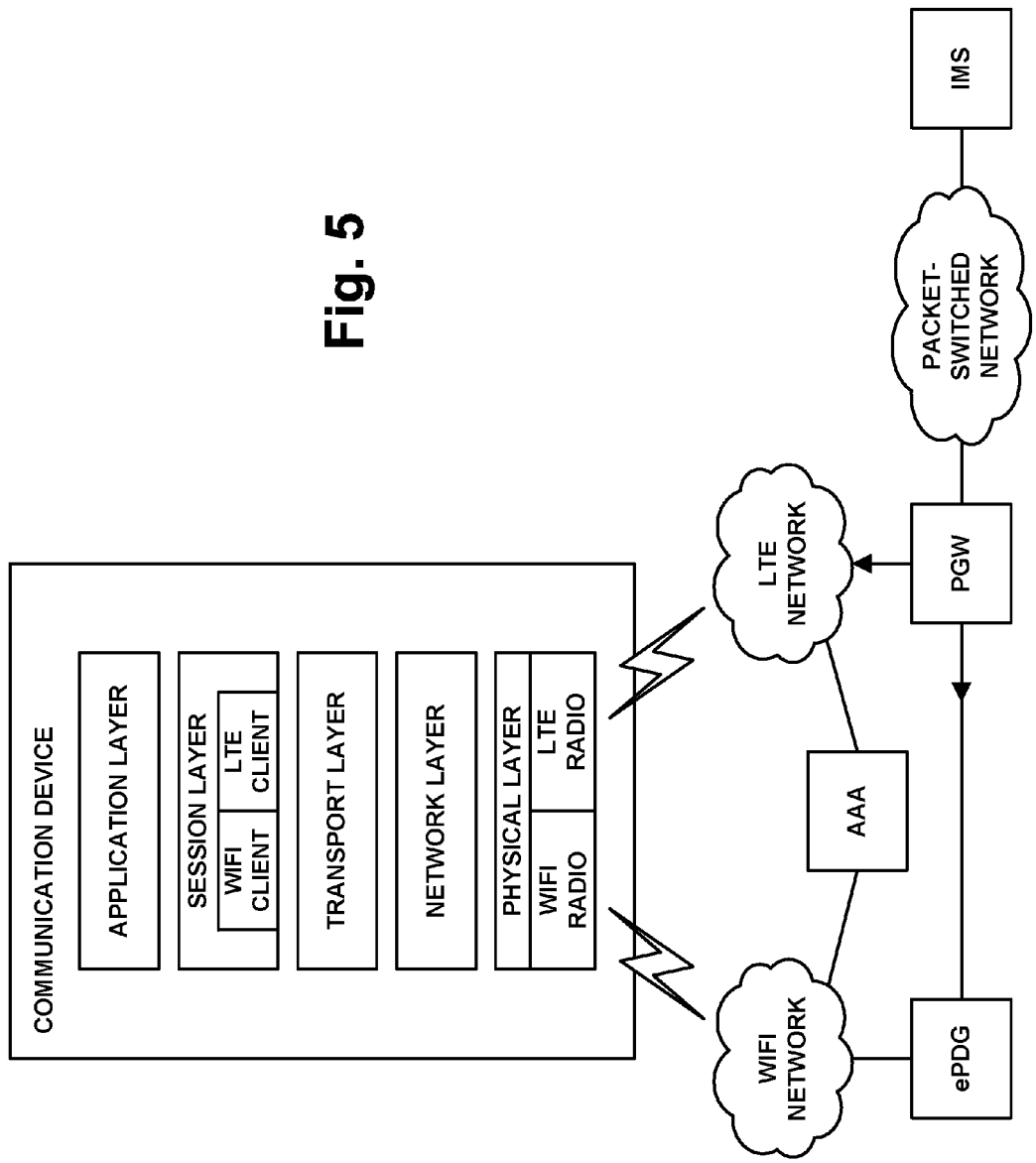
FIG. 5 is simplified block diagram depicting features of a communication device for carrying out an embodiment of the method.

FIG. 5 is next a further block diagram showing how a communication device such as UE 50 can be arranged with a logical processing stack to carry out the method. In particular, FIG. 5 shows a UE having an Open Systems Interconnection (OSI) stack that has layers including, by way of example, an application layer, a session layer, a transport layer, a network layer, and a physical layer. Further, the figure shows that the physical layer includes a WIFI radio for being served by a WIFI access network and an LTE radio for being served by an LTE network. The figure then shows the WIFI network having an ePDG, and the LTE network having a PGW, and both networks having access to an AAA server. And the figure shows the PGW providing connectivity with a packet-switched network that connects in turn with an IMS. Further, the figure shows the session layer including a WIFI client that manages WIFI communications and an LTE client that manages LTE communications.

With this arrangement, when the UE invokes its WIFI client and begins WIFI communication, the WIFI client may essentially control the transport layer, even though the UE's LTE radio is still also in operation. When the UE then begins receiving duplicates of the packet-data from the IMS, the duplicate packets would proceed up the stack to the application layer, and logic at the application layer may simply discard duplicates. However, as the packets pass through the transport layer, logic operating at the transport layer may detect that duplication and may signal in response to the controlling WIFI client at the session layer. The WIFI client may then responsively signal to the LTE radio (e.g., using an application programming interface defined by a chipset of the LTE radio) to cause the LTE radio to detach from the LTE network and perhaps further to cause the LTE radio to power down. The UE may then continue the session via its WIFI radio as discussed above.

Figure 6:
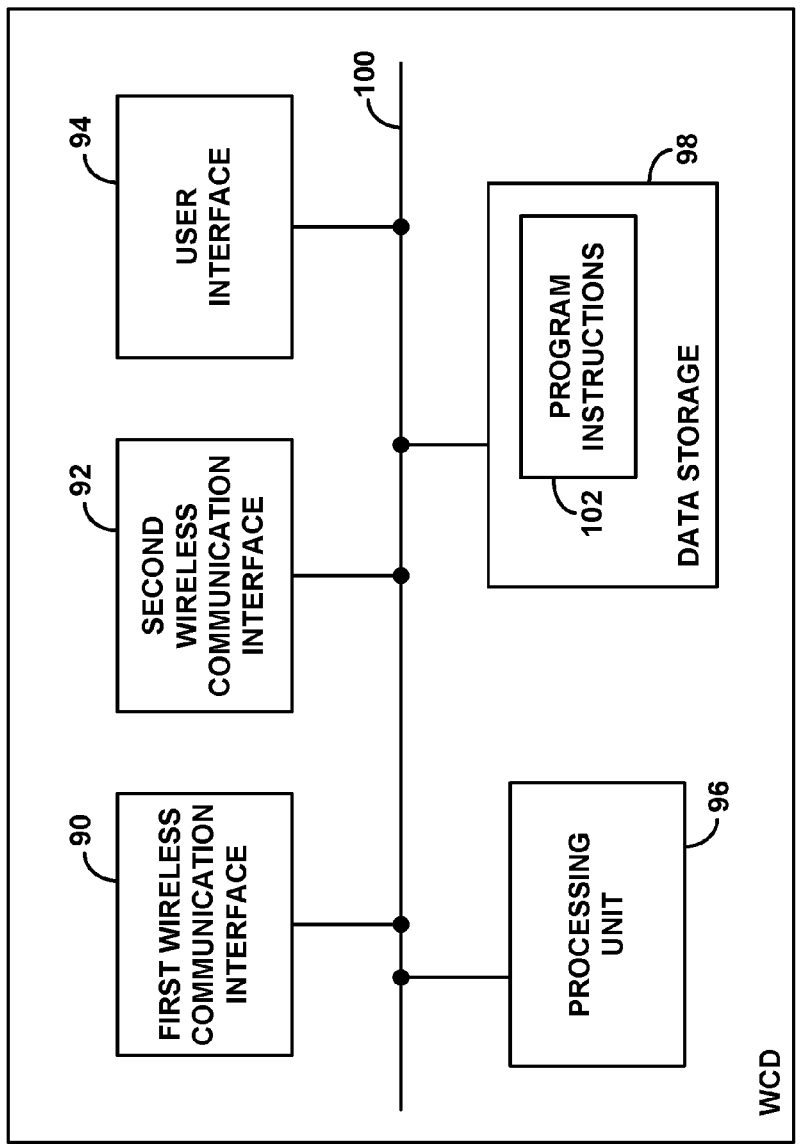
FIG. 6 is a simplified block diagram depicting components of a communication device arranged to carry out an embodiment of the method.

Finally, FIG. 6 is a simplified block diagram of a representative wireless communication device such as UE 50, showing some of the components that may be included in such a device. As shown in FIG. 6, the example communication device includes a first wireless communication interface (e.g., radio) 90, a second wireless communication interface (e.g., radio) 92, a user interface 94, a processing unit 96, and data storage 98, all of which may be communicatively linked together by a system bus or other connection mechanism 100.

First wireless communication interface 90 may be configured for the communication device to be served by a first access system over a first air interface, such as an LTE air interface or other air interface as discussed above. Similarly, second wireless communication interface 92 may be configured for the communication device to be served by a second access system over a second air interface, such as a WIFI air interface or other air interface as discussed above. In practice, these two wireless communication interfaces could be provided in the communication device as separate chipsets or other components, or could be integrated together on a single chipset or the like, and may include separate or integrated antennas.

User interface 94 facilitates interaction with a user of the communication if appropriate, such as to voice call or other real-time media interaction. As such, the user interface may include input components such as a keypad, a touch-screen, a microphone, and a camera, and the user interface may include output components such as a display screen, a loud speaker, and a headset interface.

Processing unit 96 may in turn may comprise one or more general purpose processors (e.g., INTEL microprocessors) and/or one or more special purpose processors (e.g., application specific integrated circuits or digital signal processors) and may be integrated in whole or in part with either or both wireless communication interfaces 90, 92 and/or with other aspects of the communication device.

And data storage 98 may comprise one or more volatile and/or non-volatile storage components (non-transitory), such as magnetic, optical, or flash storage and may be integrated in whole or in part with processing unit 96. As shown, data storage 98 may hold program instructions 102, which may define portions of the stack shown in FIG. 5 and may further be executable by the processing unit 96 to carry out various functions described herein. In an alternative arrangement, some or all of these functions could be provided in or for the communication device in other forms, including but not limited to any combination of hardware, firmware, and processor-executed software.

With this configuration, for instance, the communication device may detect, while the communication device is being served by the first access system over the first air interface and is receiving packet-based real-time media from a remote entity via the first access system, that the communication device begins to receive a duplicate of the packet-based real-time media from the remote entity via the second access system. Further, the communication device may respond to the detecting at least in part by discontinuing being served by the first access system, such as by transmitting a detach request via the first wireless communication interface to the first access system and perhaps further by powering down the second wireless communication interface.

Further, in line with the discussion above, a first bearer tunnel may extend from a PGW to the communication device via the first access system, the PGW may assign an IP address for use by the communication device, and the packet-based real-time media may flow from the remote entity to the PGW and via the first bearer tunnel from the PGW to the communication device, in which case transmitting the detach request may trigger release of the first bearer tunnel.

In addition, a second bearer tunnel may extend from the PGW to the communication device via the second access system, and the duplicate of the packet-based real-time media may flow via the second bearer tunnel from the PGW to the UE. In practice, for instance, the communication device may detect coverage of the second access system and, responsive to detecting coverage of the second access system, may attach with the second access system (such by associating and so forth as discussed above), which may trigger establishment of the second bearer tunnel, comprising by way of example an IPsec tunnel between the UE and a gateway of the second access system and an interface between that gateway and the PGW.

Exemplary embodiments have been described above. Those skilled in the art will understand, however, that changes and modifications may be made to these embodiments without departing from the true scope and spirit of the invention.

We claim:

1. A method comprising:
   a communication device being served by a first access network and receiving packet data from a remote endpoint via the first access network, wherein a first bearer extends via the first access network to the communication device, and wherein the packet data flows from the remote endpoint and via the first bearer to the communication device;
   while receiving the packet data from the remote endpoint via the first access network, the communication device being served by a second access network and beginning to receive a duplicate of the packet data from the remote endpoint via the second access network, wherein a second bearer extends via the second access network to the communication device, and wherein the duplicate of the packet data flows via the second bearer to the communication device;
   detecting, by the communication device, that the packet data that the communication device is receiving from the remote endpoint via the second access network is duplicative of the packet data that the communication device is receiving from the remote endpoint via the first access network; and
   responsive to the detecting, the communication device discontinuing being served by the first access network, wherein discontinuing being served by the first access network comprises transmitting a detach request to the first access network.

2. The method of claim 1, wherein the packet data defines a packet-based real-time media stream.

3. The method of claim 2, wherein the packet-based real-time media stream is a voice over Internet Protocol (VoIP) stream.

4. The method of claim 3, wherein the communication device is a wireless communication device, wherein the first access network comprises a first radio access network that serves the communication device over a first air interface according to a first air interface protocol, and wherein the second access network comprises a second radio access network that serves the communication device over a second air interface according to a second air interface protocol different than the first air interface protocol.

5. The method of claim 4, wherein the first air interface protocol is Long Term Evolution (LTE), and wherein the second air interface protocol is a Wireless Local Area Network (WLAN) protocol.

6. A user equipment device (UE) comprising:
   a first radio configured for the UE to be served by a first access system over a first air interface; and
   a second radio configured for the UE to be served by a second access system over a second air interface,
   wherein the UE is configured to detect, while the UE is being served by the first access system over the first air interface and is receiving packet-based real-time media from a remote entity via the first access system, that the UE begins to receive a duplicate of the packet-based real-time media from the remote entity via the second access system; and
   wherein the UE is configured to respond to the detecting at least in part by discontinuing being served by the first access system, whereby the UE proceeds with receipt of the packet-based real-time media from the remote entity via the second system,
   wherein discontinuing being served by the first access system comprises transmitting via the first radio, from the UE to the first access system, a detach request,
   wherein a first bearer tunnel extends to the UE via the first access system, wherein the packet-based real-time media flows from the remote entity and via the first bearer tunnel to the UE, and wherein transmitting the detach request triggers release of the first bearer tunnel, and
   wherein a second bearer tunnel extends to the UE via the second access system, and wherein the duplicate of the packet-based real-time media flows via the second bearer tunnel to the UE.

7. The UE of claim 6, wherein first air interface is a Long Term Evolution (LTE) air interface, and wherein the second air interface is a Wireless Local Area Network (WLAN) air interface.

8. The UE of claim 6, wherein the UE is further configured to detect coverage of the second access system and, responsive to detecting coverage of the second access system, to attach with the second access system, wherein attaching with the second access system triggers establishment of the second bearer tunnel.

9. The UE of claim 6, wherein discontinuing being served by the first access system further comprises powering down the first radio.

10. A method comprising:
- receiving, by a user equipment device (UE), packet-based real-time media from a remote endpoint via a first access system that serves the UE over a first air interface, wherein a first bearer tunnel extends to the UE via the first air interface, and wherein the packet-based real-time media flows from the remote endpoint and via the first bearer tunnel to the UE;
- while receiving the packet-based real-time media via the first access system, the UE being served by a second access system over a second air interface and the UE beginning to receive via the second access system a duplicate of the packet-based real-time media that the UE is receiving via the first access system, wherein a second bearer tunnel extends the UE via the second air interface, and wherein the duplicate of the packet-based real-time media flows from via the second bearer tunnel to the UE;
- detecting, by the UE that the UE is receiving the duplicate via the second access system; and
- responsive to the detecting, the UE discontinuing being served by the first access system,
- wherein the UE has a first radio for being served by the first access system over the first air interface and a second radio for being served by the second access system over the second air interface,
- wherein the first access system comprises a first access node that serves the UE over the first air interface, and wherein the first bearer tunnel extends via the first access node to the first radio of the UE, and
- wherein the second access system comprises a second access node that serves the UE over the second air interface, and wherein the second bearer tunnel extends via the second access node to the second radio of the UE.

11. The method of claim 10, wherein the first air interface is a Wireless Wide Area Network (WWAN) air interface, and wherein the second air interface is a Wireless Local Area Network (WLAN) air interface.

12. The method of claim 11, wherein the WWAN air interface is a Long Term Evolution (LTE) air interface.

13. The method of claim 10, wherein discontinuing being served by the first access system comprises transmitting from the UE to the first access system via the first air interface a detach request to trigger release of the first bearer tunnel.

14. The method of claim 13, wherein discontinuing being served by the first access system further comprises powering down the first radio.

15. The method of claim 10, wherein the UE includes an operating system and further includes an application for receiving and playing out the packet-based real-time media, and wherein detecting that the UE is receiving the duplicate via the second access system is carried out by the operating system or the application.

\* \* \* \* \*